(12) United States Patent
Henseleit

(10) Patent No.: US 7,665,778 B2
(45) Date of Patent: Feb. 23, 2010

(54) VEHICLE BUMPER AND METHOD OF MAKING SAME

(76) Inventor: Karl Henseleit, 110 West Street, Suite 201, Jonesville, MI (US) 49250

( * ) Notice: Subject to any disclaimer, the term of this patent is extended or adjusted under 35 U.S.C. 154(b) by 155 days.

(21) Appl. No.: 11/670,817

(22) Filed: Feb. 2, 2007

(65) Prior Publication Data

US 2007/0176440 A1 Aug. 2, 2007

Related U.S. Application Data

(60) Provisional application No. 60/764,569, filed on Feb. 2, 2006.

(51) Int. Cl.
B60R 19/02 (2006.01)
(52) U.S. Cl. .................... 293/102; 293/120; 293/155
(58) Field of Classification Search ............... 293/102, 293/155, 120, 133; 296/187.03, 187.09, 296/187.1, 187.11
See application file for complete search history.

(56) References Cited

U.S. PATENT DOCUMENTS

| | | | |
|---|---|---|---|
| 4,597,601 A | 7/1986 | Manning | |
| 4,652,032 A | 3/1987 | Smith | |
| 5,395,036 A | 3/1995 | Sturrus | |
| 5,785,367 A * | 7/1998 | Baumann et al. | 293/133 |
| 5,934,544 A | 8/1999 | Lee et al. | |
| 6,000,738 A | 12/1999 | Stewart et al. | |
| 6,042,163 A | 3/2000 | Reiffer | |
| 6,141,935 A | 11/2000 | Artner et al. | |
| 6,352,297 B1 | 3/2002 | Sundgren et al. | |
| 6,357,816 B1 | 3/2002 | Porter | |
| 6,360,441 B1 | 3/2002 | Himsl et al. | |
| 6,398,275 B1 | 6/2002 | Hartel et al. | |
| 6,439,650 B2 * | 8/2002 | Artner et al. | 296/187.03 |
| 6,485,072 B1 | 11/2002 | Werner et al. | |
| 6,510,771 B2 | 1/2003 | Sturrus et al. | |
| 6,540,276 B2 * | 4/2003 | Azuchi et al. | 293/102 |
| 6,669,252 B2 | 12/2003 | Roussel et al. | |
| 6,688,661 B2 | 2/2004 | Yamamoto | |
| 6,709,044 B2 * | 3/2004 | Frank | 293/102 |
| 6,726,261 B2 | 4/2004 | Goto et al. | |
| 6,746,119 B2 * | 6/2004 | Ezekiel | 351/161 |
| 6,814,380 B2 | 11/2004 | Yoshida et al. | |
| 6,817,652 B2 | 11/2004 | Graber et al. | |
| 6,820,451 B2 | 11/2004 | Renzzulla et al. | |
| 6,851,731 B2 * | 2/2005 | Janssen | 293/102 |
| 6,923,482 B2 | 8/2005 | Cumming et al. | |
| 6,926,320 B2 * | 8/2005 | Garcia et al. | 293/102 |
| 6,948,749 B2 | 9/2005 | Graber | |
| 6,971,690 B2 * | 12/2005 | Evans et al. | 293/102 |
| 6,971,691 B1 * | 12/2005 | Heatherington et al. | 293/102 |
| 6,986,536 B1 * | 1/2006 | Heatherington et al. | 293/102 |
| 7,163,241 B2 * | 1/2007 | Liu et al. | 293/102 |

(Continued)

Primary Examiner—Glenn Dayoan
Assistant Examiner—Gregory Blankenship
(74) Attorney, Agent, or Firm—Burgess Law Offices, PLLC

(57) ABSTRACT

A vehicle bumper and a method for making a vehicle bumper formed of first and second members. Each of the first and second members are formed of substantially similar first and second U-shaped members positioned such that the respective sidewalls of the first and second U-shaped members are positioned adjacent one another. The bumper including a plurality of apertures therein formed by cutouts extending inward from the peripheral edge of each of the first and second U-shaped members.

18 Claims, 10 Drawing Sheets

U.S. PATENT DOCUMENTS

| | | |
|---|---|---|
| 7,401,957 B2 * | 7/2008 | Kroll .......................... 362/505 |
| 7,407,219 B2 * | 8/2008 | Glasgow et al. ........ 296/187.03 |
| 2002/0040525 A1 | 4/2002 | Himsl et al. |
| 2004/0094976 A1 | 5/2004 | Cate et al. |
| 2004/0130166 A1 * | 7/2004 | Trancart et al. ............. 293/102 |
| 2005/0062299 A1 | 3/2005 | Renzzulla et al. |
| 2005/0213478 A1 * | 9/2005 | Glasgow et al. ............. 369/262 |
| 2006/0125254 A1 * | 6/2006 | Arns et al. .................. 293/155 |

* cited by examiner

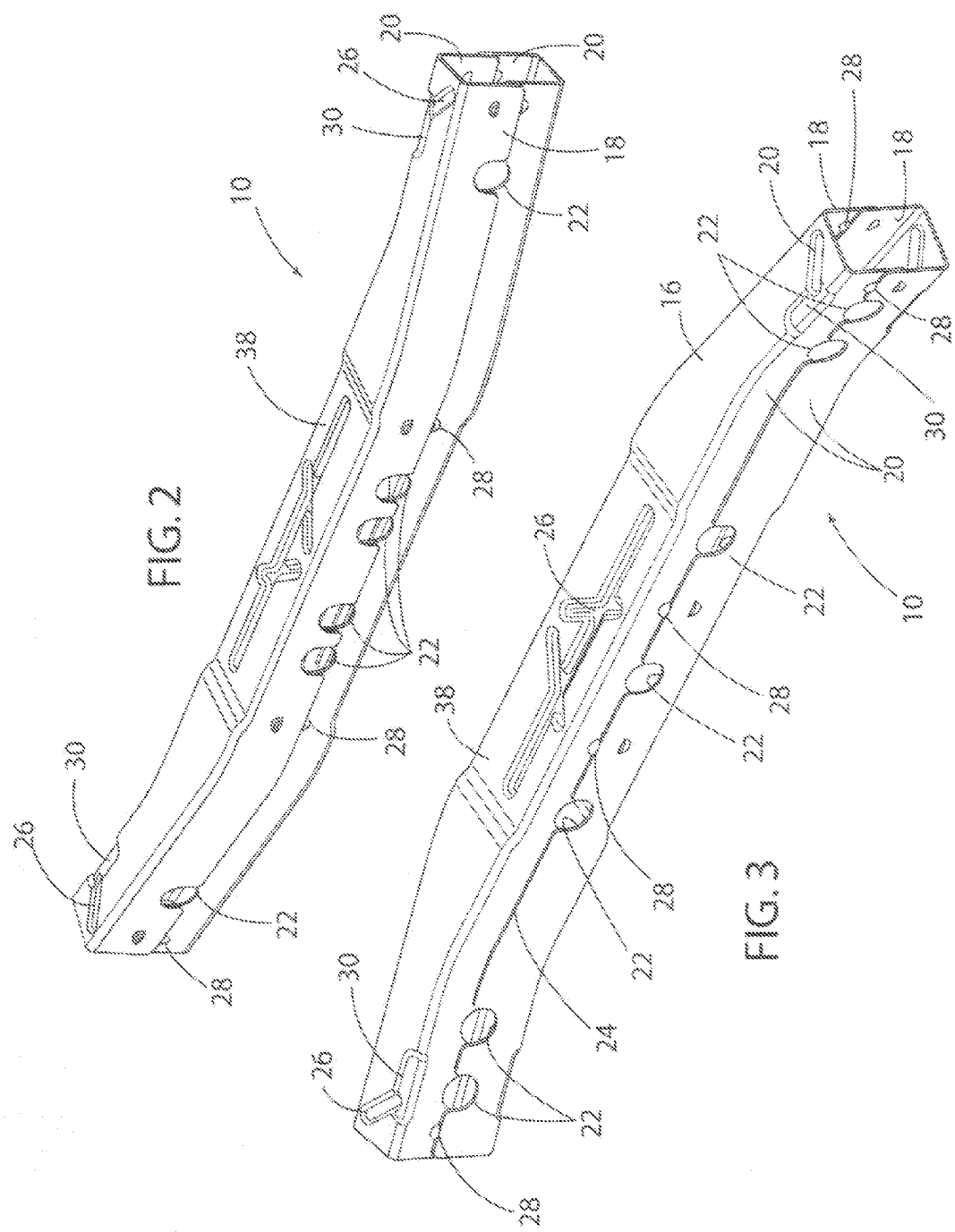

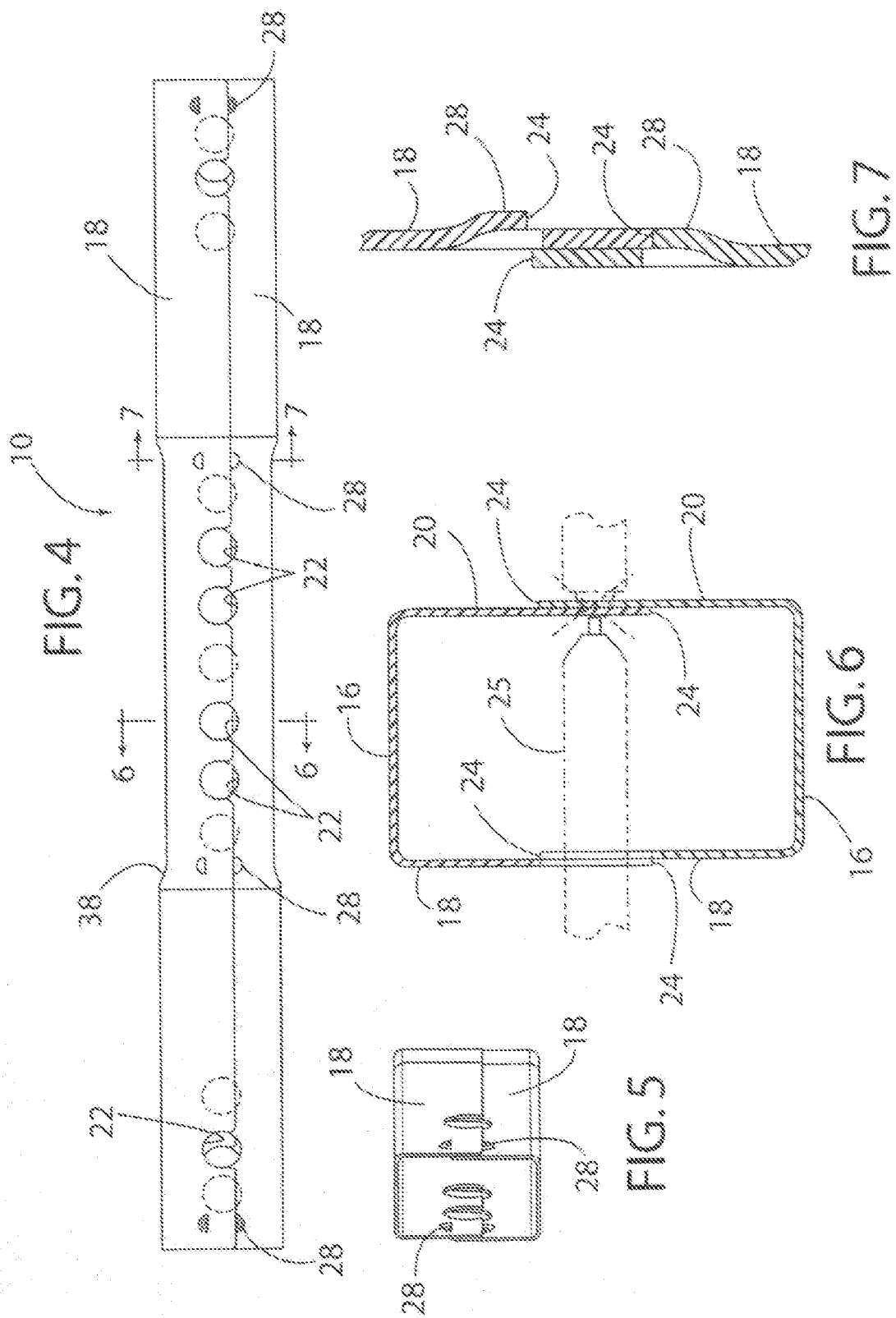

VEHICLE BUMPER AND METHOD OF MAKING SAME

CROSS-REFERENCE TO RELATED APPLICATIONS

This application claims the benefit of U.S. Provisional Application No. 60/764,569, filed Feb. 2, 2006,

BACKGROUND OF THE INVENTION

1. Field of the Invention

The present invention relates generally to a bumper for a vehicle.

2. Description of Related Art

Motor vehicles typically use a bumper system at the front and rear end thereof. The bumper system typically includes a bumper beam that extends across the front and rear end of the vehicle. The respective bumper beams are typically attached to either a pair of rails or the vehicle frame. Many bumper systems include an energy absorption member that extends across and is secured to the bumper beam. In some cases, the bumper system includes a facia or cover located over the bumper beam.

The motor vehicle industry has established certain standards and must adhere to certain government regulations concerning low-speed vehicle impact. Further, vehicle bumpers are typically made of a low-weight, high-strength steel to maintain structural integrity and provide a bumper beam that can withstand impact at speeds of up to 5 mph without sustaining damage while at the same time maintaining a low weight to minimize overall vehicle weight. Accordingly, the bumpers typically have a high strength to weight ratio and are formed of a material that can be relatively easy to manufacture.

Prior art vehicle bumpers are typically manufactured using a roll forming process. Roll forming is a continuous metal forming process that takes sheet, strip or coiled stock and bends or forms it into a shape having an essentially identical cross-section by feeding the material between successive pairs of rollers that increasingly shape the material until the material reaches a desired cross-section. Accordingly, the respective roll forming tool limits the shape or cross-section of the workpiece such that it does not vary along its longitudinal axis. In some cases several roll formed parts are joined together to form a box-shaped member that forms the bumper. While roll forming is a particularly attractive manufacturing method for mass producing bumper beams using high-strength materials, roll forming limits the shape and configuration of the bumper. In addition using roll forming to make a complex bumper configuration or cross-section is often cost prohibitive.

SUMMARY OF THE INVENTION

Accordingly, the present invention is a vehicle bumper and a method of making the bumper. The bumper includes first and second sections or members that fit together to form the bumper. In the preferred embodiment the bumper includes a first U-shaped member having first and second opposed sidewalls connected by a base. The first member extends longitudinally between first and second ends. The bumper also includes a second U-shaped member having first and second opposed sidewalls connected by a base. The second member also extends longitudinally between first and second ends. The first and second members are positioned such that the respective first sidewalls of the first and second member are placed adjacent and joined together. In addition, the second sidewalls of the first and second member are also placed adjacent and joined together. The first and second U-shaped members cooperate together to form the bumper wherein the bumper includes a cross-section, taken along the longitudinal axis extending from the first and second ends of the bumper, that varies along the longitudinal axis of the first and second members.

In a further embodiment, each of the first and second U-shaped members has a detent located on an outer surface of the opposed sidewalls. The detent functions to locate and thereby properly position the spacing of the first U-shaped member with respect to the second U-shaped member.

In addition, the present invention also includes a method for forming a bumper. The method including stamping the first and second U-shaped members from a flat or blank sheet of high-strength material, which may include a blank made of 140 K.S.I. high-strength steel. Using a forming tool and stamping the first and second members provides a forming process whereby the first and second members can be formed in a plurality of configurations, including curved along or about the longitudinal axis thereof, typically by using a plurality of forming dies. Forming the first and second members in this way, typically by stamping, enables the first and second members to be formed in a plurality of shapes and configurations which otherwise are not attainable through a roll forming process.

In addition, a further embodiment of the present invention contemplates forming a single member using a single forming tool and using the single-member for the first and second members by turning one of the members over whereby the respective sidewalls of the first and second U-shaped members are positioned adjacent and form the front and rear face of the bumper. This method reduces overall forming cost as only one forming tool is required and the single-member can be formed using a stamping process.

BRIEF DESCRIPTION OF THE DRAWINGS

The present invention will become more fully understood from the detailed description and the accompanying drawings, wherein:

FIG. 2 is a front, perspective view of a vehicle bumper according to the present invention.

FIG. 3 is a rear, perspective view of a vehicle bumper according to the present invention FIG. 4 is a front view of a vehicle bumper according to the present invention.

FIG. 5 is a side view of a vehicle bumper according to the present invention.

FIG. 6 is a sectional view taken along lines 6-6 of FIG. 4, with a welding apparatus illustrated in phantom.

FIG. 7 is a partial sectional view taken along lines 7-7 of FIG. 4.

DETAILED DESCRIPTION OF THE PREFERRED EMBODIMENTS

Figure 1:
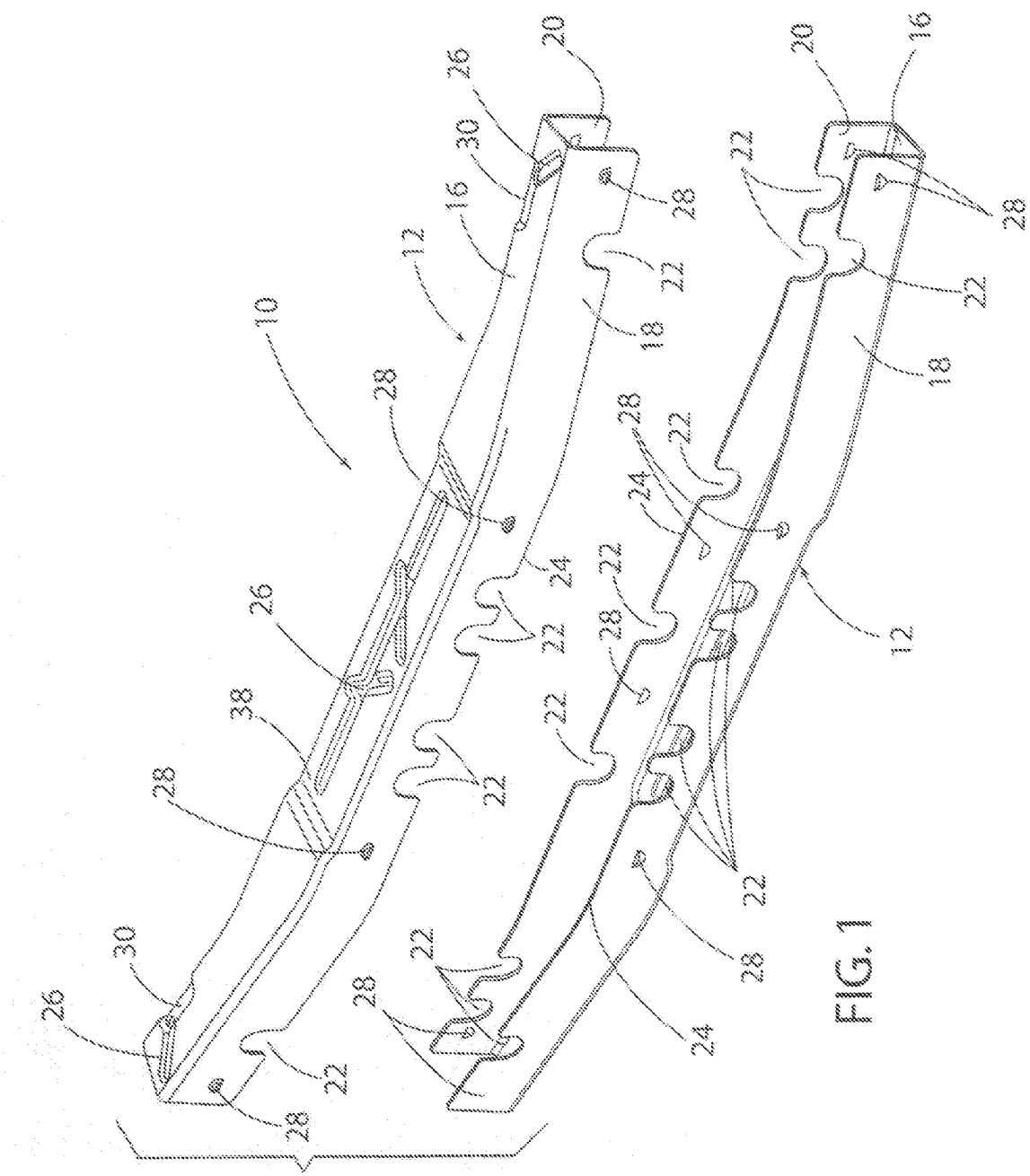
FIG. 1 is an exploded perspective view of a vehicle bumper according to one embodiment of the present invention.

The following description of the preferred embodiment(s) is merely exemplary in nature and is in no way intended to limit the invention, its application, or uses.

Turning now to the drawings, specifically FIGS. 1-5, there is shown a bumper, seen generally at 10, according to the present invention. The bumper 10 includes upper and lower members or sections 12 that fit together to form the bumper 10. In the preferred embodiment, the upper and lower members or sections 12 are identical. Accordingly, the manufacturing process forms only one member thereby eliminating the need to form separate upper and lower members. In accordance with the present invention, two identical members are used with one of the members rotated to an upside down position. As illustrated, the member 12 has a substantially C-shaped or U-shaped cross-section including a base portion 16 and a pair of sidewalls 18, 20 that extend outward from the base portion 16.

In addition, the member 12 further includes a plurality of U-shaped cutouts 22 extending inwardly from the outer peripheral edge 24 of the sidewalls 18, 20. As illustrated, the U-shaped cutouts 22 of each of the respective upper and lower members 12 cooperate, when the upper and lower members 12 are placed together in a side-by-side relationship, to form apertures in the side wall of the bumper. As illustrated in FIG. 6, the apertures are in one sidewall 18 only, and allow access to the opposite side wall 20. The apertures enable a fastening apparatus such as a spot welder 25, illustrated in phantom, to pass through the sidewall 18 and engage the rear sidewall 20 to fasten the respective sidewalls 20 of the upper and lower member 12 together. Wild spot welding is shown as the preferred method of fastening the respective sidewalls together. Other fastening means could also be used. As illustrated, there are a plurality of apertures located in both the front and rear sidewalls of the bumper 10 whereby the respective front sidewalls 18 and rear sidewalls 20 of the upper and lower members 12 are welded together to fasten the upper and lower members 12 to one another.

During the forming process, deformation elements, including indentations 26, are stamped into the body of the member 12. The deformation elements or indentations 26 operate to provide a path or area that deforms to transfer and absorb energy resulting from or occurring during an impact load. While shown as indentations, the deformation elements may also include holes or slots positioned on the member 12. In addition, the base member 16 includes an indented or recessed portion 38 that further aids in controlling deformation of the bumper 10 and provides another mechanism to transfer and absorb impact energy.

The member 12 further includes a plurality of eyebrows or other bosses, upset portions or detent means 28 located in the sidewalls 18, 20 of the member 12. When placed together, as shown in FIG. 7, the outer peripheral edge 24 of each member 12 rests on the eyebrow 28 of the adjacent sidewall 18, 20 to properly locate the height and position of the members 12 with respect to one another. As illustrated, upon assembly the respective upper and lower members 12 are placed in a nested side by side relationship wherein the front sidewalls 18 are adjacent one another while the rear sidewalls 20 are also adjacent one another. While shown with the sidewall 18 of the upper member being placed on the outside, this is for illustrative purposes only, as the upper sidewall could also be placed on the inside of the lower sidewall 18 whereby the rear sidewall 20 of the upper member would then be placed on the outside or rearward of the rear sidewall 20 of the lower member. Accordingly, depending upon the orientation, only some of the detents, or eyebrows 28 will engage the outer peripheral edge 24 of the front and rear sidewalls. For example, as illustrated in FIGS. 4-7, the outer peripheral edge of the upper sidewall 18 will engage the detent or eyebrow 28 on the front side wall of the lower member while the eyebrow on the front surface or front side wall of the upper member remains free. Consequently, as illustrated in FIG. 5, the eyebrow located on the rear sidewall of the upper member will engage the outer peripheral edge of the rear sidewall of the lower member. Should the members be reversed, that is the front side wall of the upper member be placed behind the front side wall of the lower member, then the orientation would simply reverse and the detent or eyebrow 28 of the front side wall of the upper member would engage the outer peripheral edge 24 of the front side wall of the lower member.

Accordingly, the upper and lower members 12 are identical with the bumper beam being formed by turning one of the members over and placing the two members 12 together until the respective outer peripheral edges 24 rest on the respective detent members or eyebrows 28. Once properly positioned, as illustrated in FIG. 6, the upper and lower members are then fastened together to form the bumper 10. It should be understood that the present invention enables forming a bumper from a high-strength steel, typically from 100-140 k.s.i. using a stamping process wherein a member 12 is stamped from a steel blank after which two similar members are combined to form the bumper 10. The stamping process provides a method whereby a plurality of bumper shapes, configurations and cross sections can be formed that would not be formable using a roll forming process. Further, a single forming tool or die assembly is utilized to form the member 12.

Figure 8:
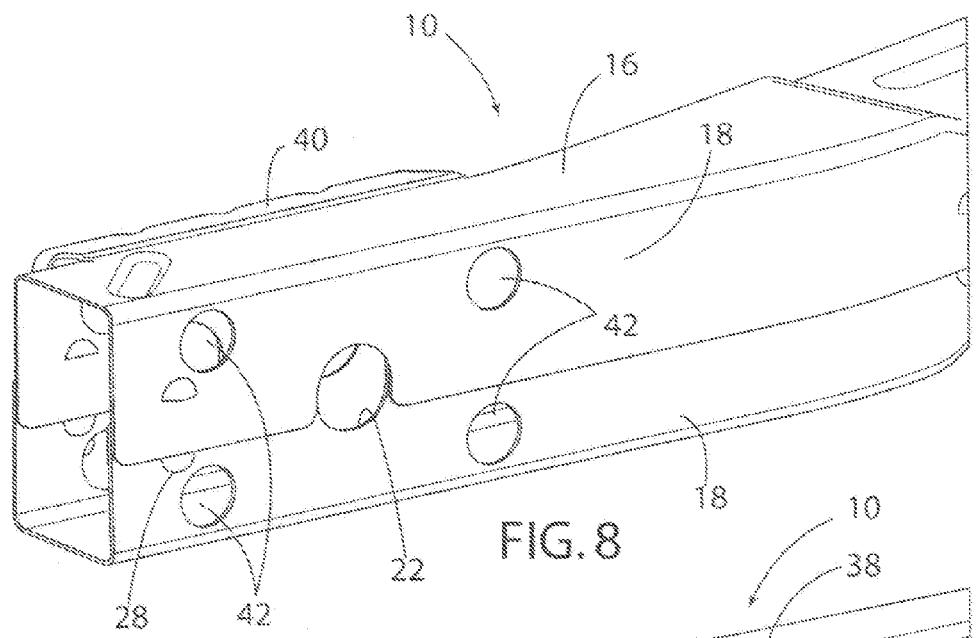
FIG. 8 is a partial front, perspective view of a bumper according to the present invention having an attachment assembly.
Figure 9:
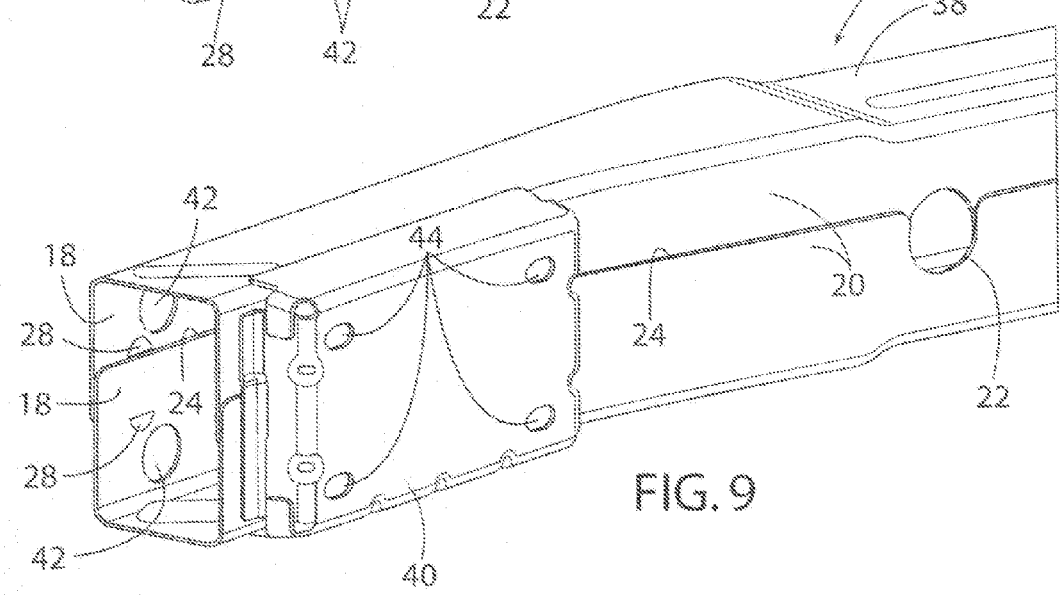
FIG. 9 is a partial rear, perspective view of the bumper of FIG. 9 illustrating the attachment assembly.

FIGS. 8-9 illustrate a further aspect of the present invention illustrating mounting hardware 40 fastened to the bumper 10 by welding or some other type of fastening means. As illustrated in FIG. 8 apertures 42 are formed in the front sidewall 18 of both the upper and lower members 12. These apertures provide access to the mounting hardware 40. Accordingly, the bumper 10 is attached to the frame of an automotive vehicle typically through threaded studs extending through apertures 44 located in the mounting hardware 40 whereby the threaded studs are accessible and a fastener can be installed thereon through the apertures 42.

Figure 10:
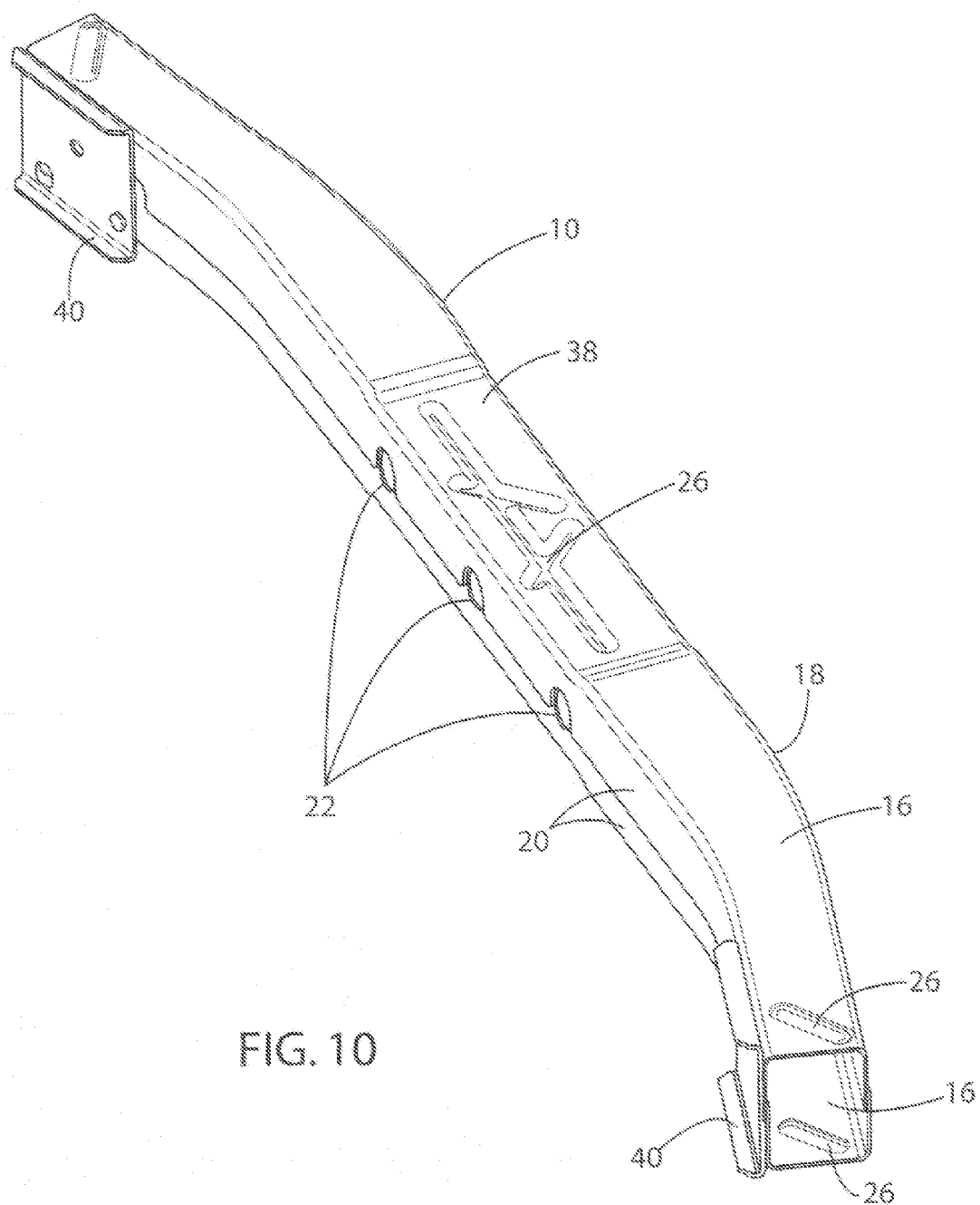
FIG. 10 is a perspective view of a bumper according to the present invention having an alternative attachment assembly.
Figure 11:
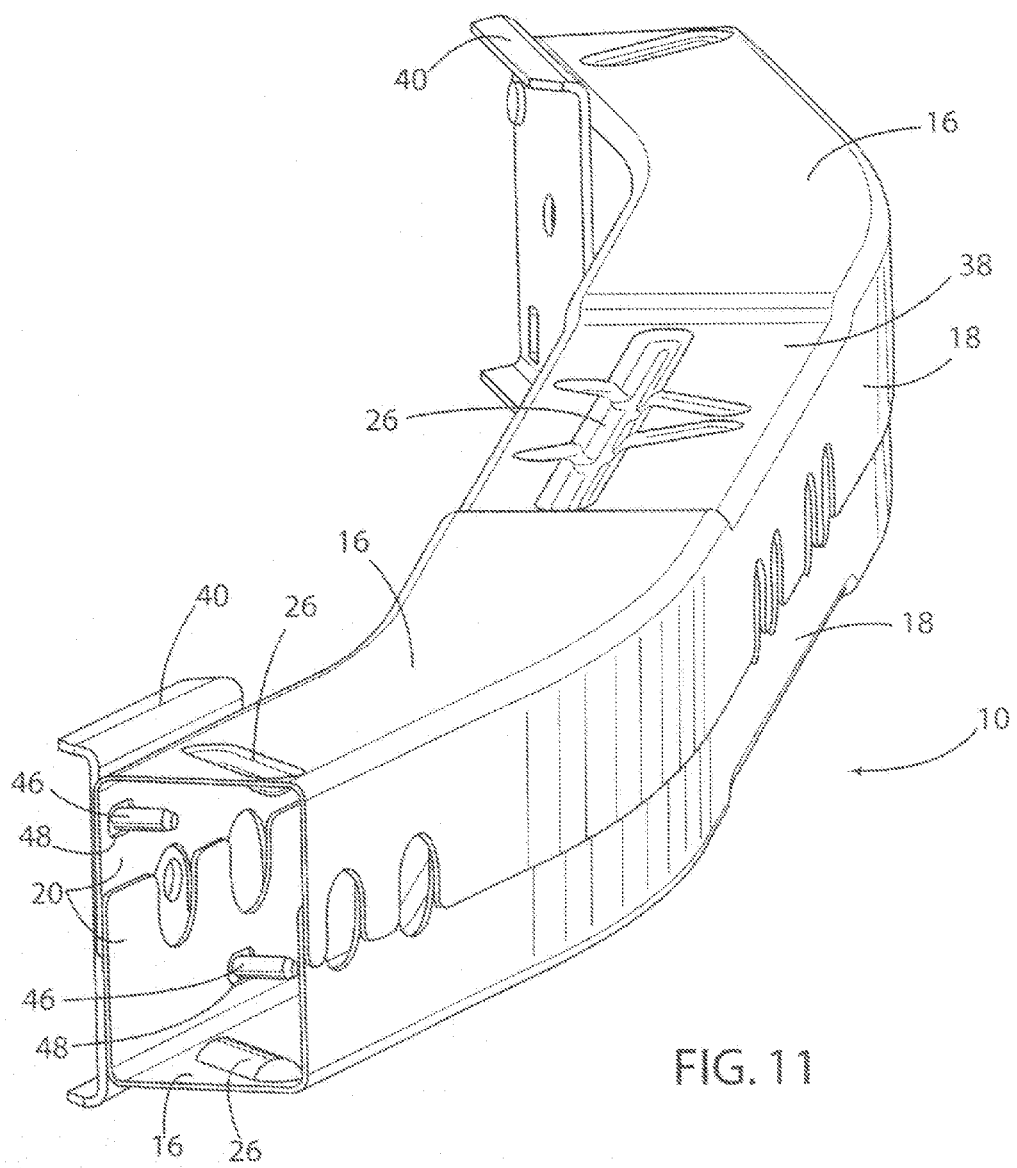
FIG. 11 is a side perspective view of the bumper of FIG. 10 illustrating the alternative attachment assembly.

FIGS. 10-11 illustrate another embodiment of mounting hardware 40 used to secure the bumper 10 to a vehicle. As illustrated in FIG. 11, mounting hardware 48 is attached via studs 46 extending through apertures 48 located in the respective rear sidewalls 20 of the upper and lower members 12.

Figure 12:
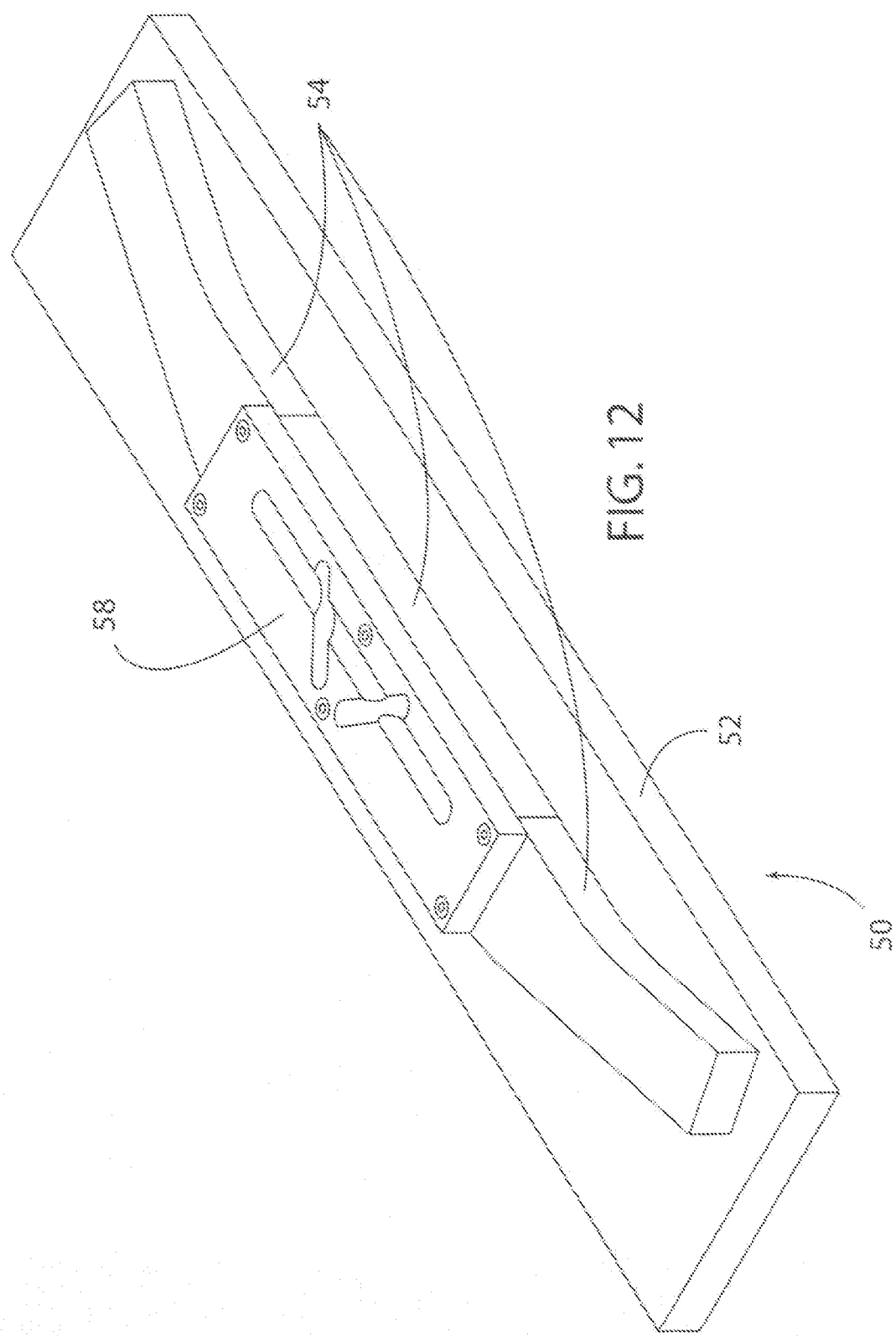
FIG. 12 is a perspective view of a forming tool used for making a bumper according to the present invention.
Figure 13:
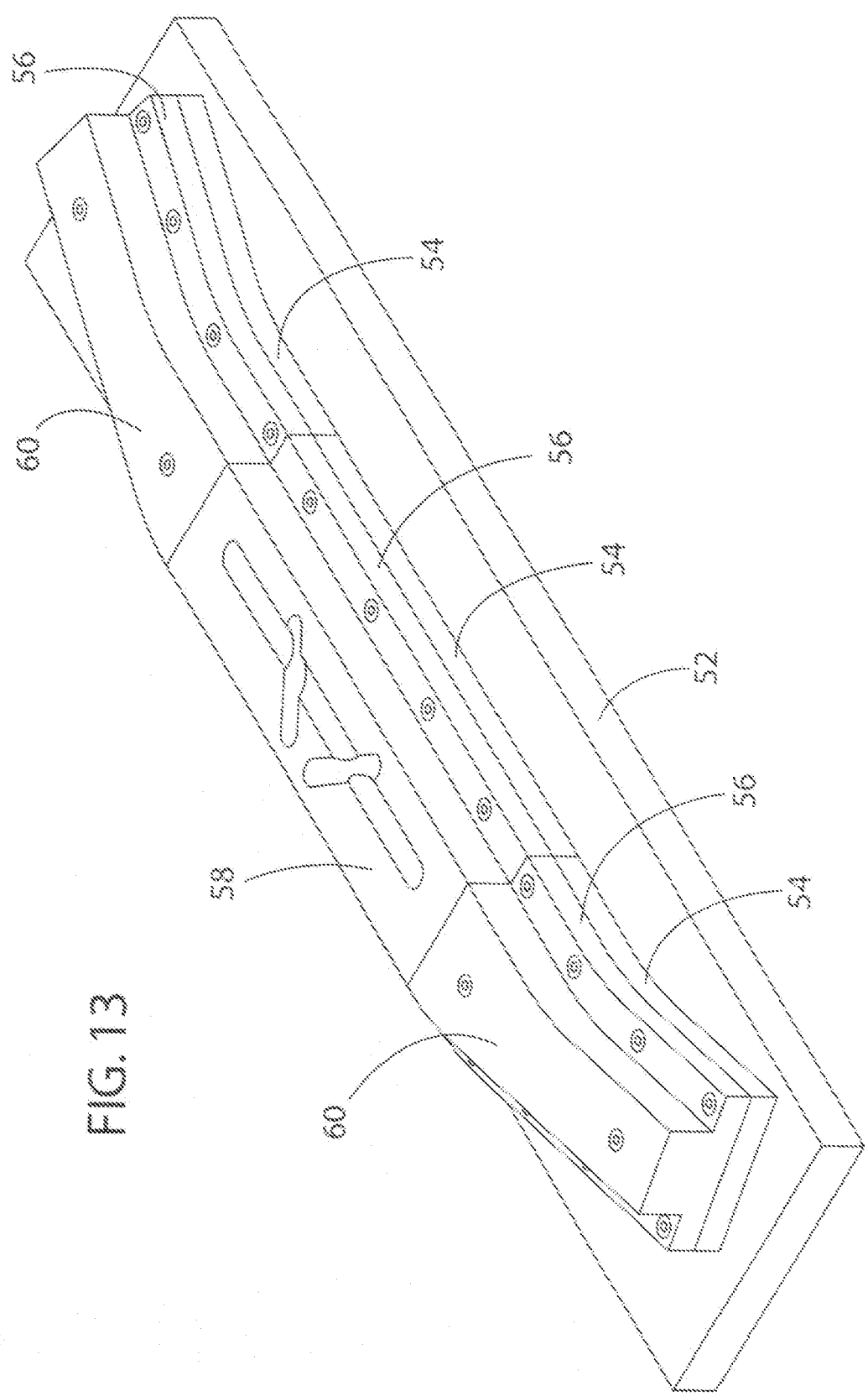
FIG. 13 is a perspective view of a further embodiment of the forming tool of FIG. 12.
Figure 14:
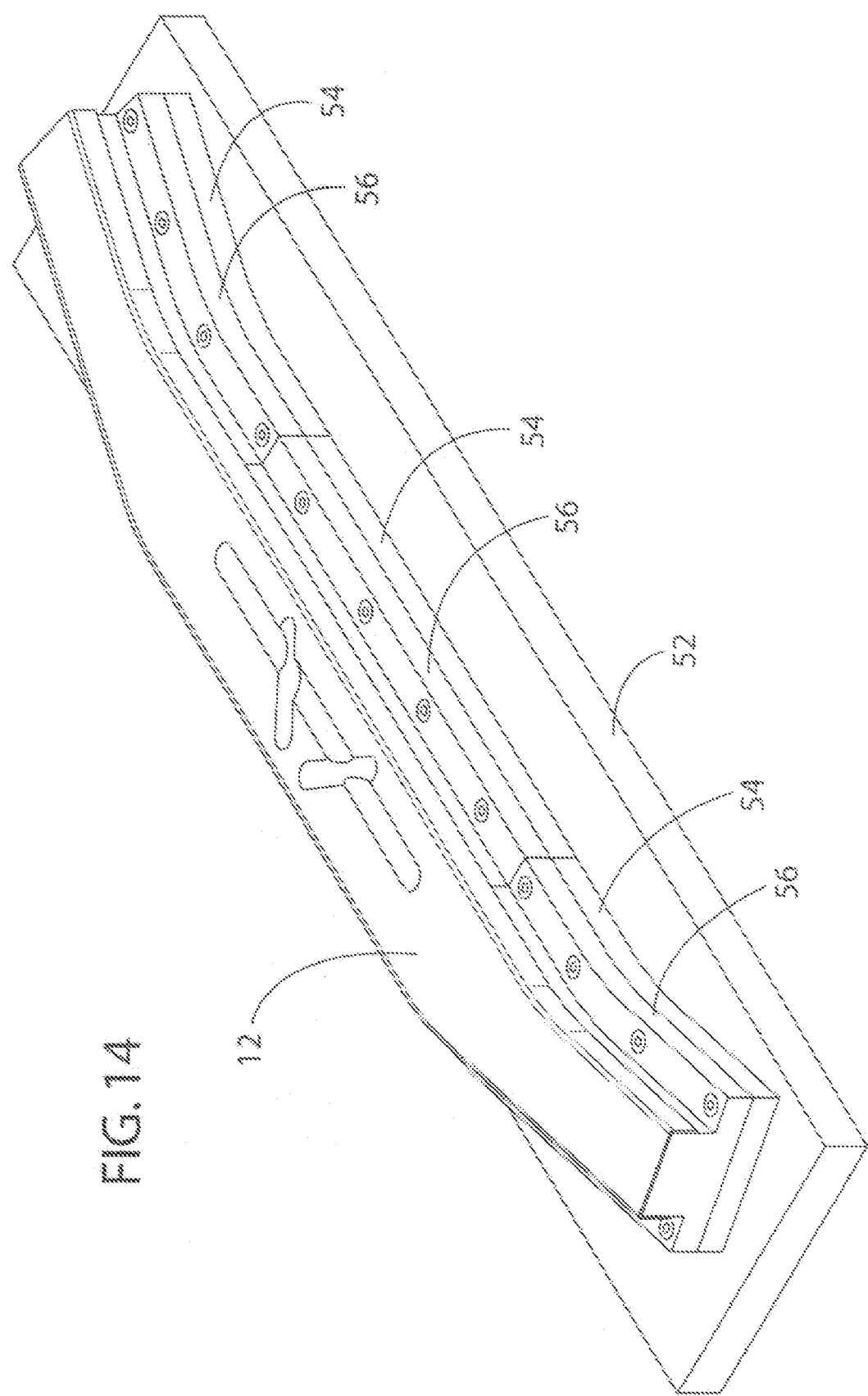
FIG. 14 is a perspective view of a forming tool according to the present embodiment having a partially formed bumper component located thereon.

FIGS. 12-14 illustrate a variable-component forming tool 50. The forming tool 50 includes a base plate 52, multiple risers 54, and multi-piece die members 56, see FIG. 13. The forming tool 50 includes a center section 58 and changeable side sections 60 on each side thereof. Accordingly, changing the shape or configuration of the bumper merely requires changing one of the components or sections of the forming tool 50. FIG. 14 illustrates a partially formed member 12 located on the forming tool 50. As set forth herein, the member 12 is formed through a stamping or press forming operation whereby a metal blank takes the shape of the die members 56 of the forming tool 50. Thus, one forming tool 50 with a plurality of changeable components or die members 56 can be used to form various bumper or member 12 configurations.

Figure 15:
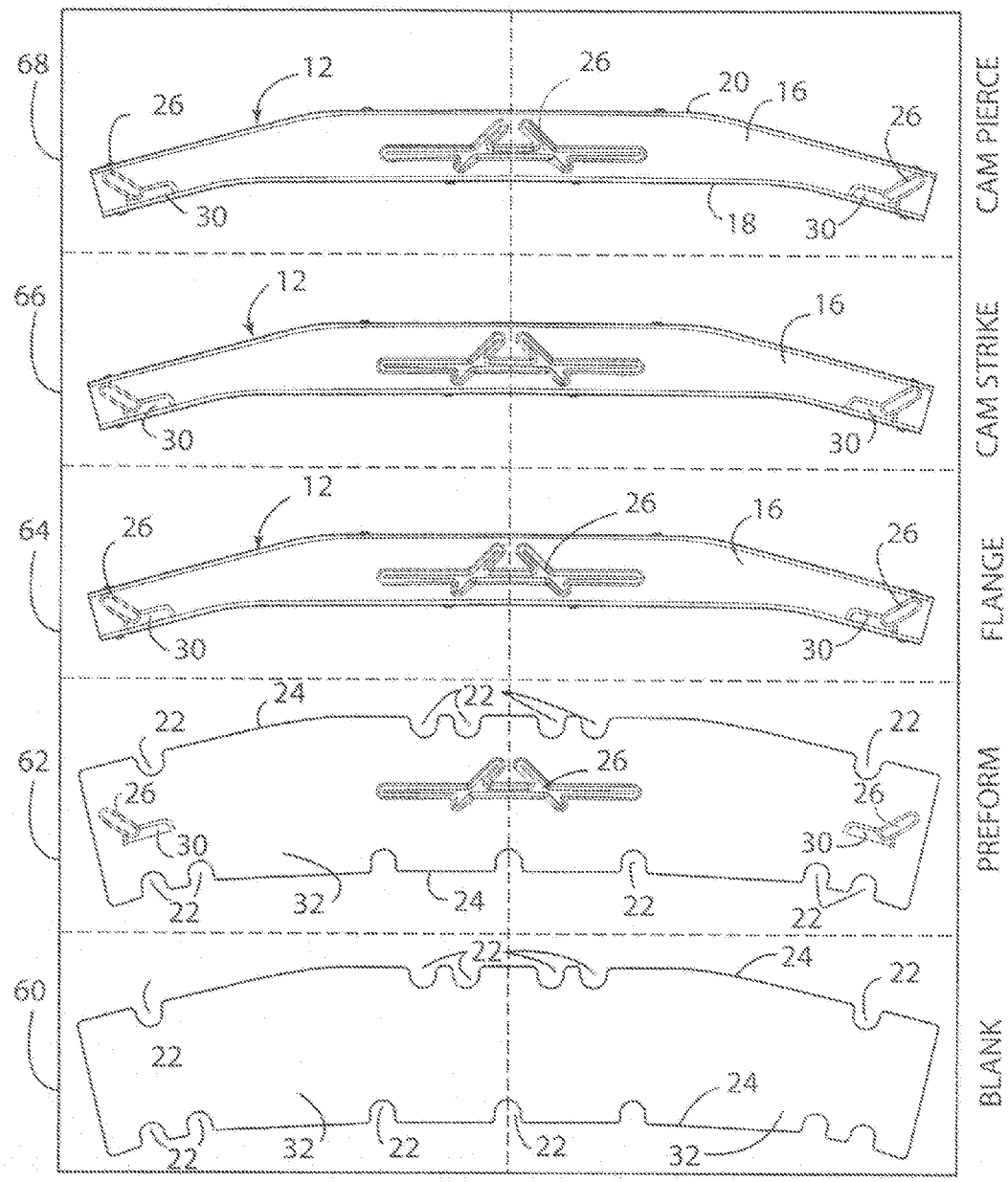
FIG. 15 is a schematic illustration of the various stages and steps used to form a vehicle bumper according to the present invention.

FIG. 15 illustrates the forming process, including a first step 60 of cutting out or forming a blank 32 from a material such as high-strength steel. This step may also include forming the cutouts or U-shaped sections 22 adjacent the outer peripheral edge 24 of the blank 32. The next step 62 includes a stamping operation to form the deformation elements such as the indentations 26 in the blank 32. During this step, a mounting surface 30 including additional openings 42 may be formed in the blank 32 for use in attaching a mounting bracket 40 used to secure the bumper 10 to a vehicle, see FIGS. 8-11.

The next step 64 is placing the blank 32 in the forming tool 50 and performing a stamping operation to stamp the blank 32 and form the sidewalls 18, 20. The next step 66 is a cam strike operation, which operates to set the sidewalls 18, 20 at a 90° angle with respect to the base 18. The next step is a cam pierce operation used to create the eyebrows or detent means 28 in the sidewall 18, 20.

After the forming or stamping operation is completed, the bumper 10 is assembled by taking two members 12, rotating one of the members 12 180° about its longitudinal axis, and placing them in the position shown in FIG. 1. The members 12 are placed together with the respective sidewalls 18, 20 of the upper and lower members 12 placed adjacent one another as illustrated in FIGS. 5-7. The respective upper and lower members 12 slide together until the outer peripheral edge 24 of one member 12 engages the eyebrows or detent means 28 or the opposite member 12 as shown in FIG. 7. At this point, the members 12 are properly located with respect to one another. The two members 12 are then welded to one another using a spot welding assembly. As illustrated in FIG. 6, the electrode of the spot welder passes through the openings 22 located in the assembled bumper 10 to weld the opposite side of the bumper 10. Since there are holes 22 on each side, the bumper 10 is welded on both the inner and outer or front and rear sides.

Accordingly the present invention provides a vehicle bumper 10 having a plurality of configurations including those having a swept or curved configuration. The bumper 10 is formed of stamped pieces that can be modified and used for a multitude of different bumper shapes.

What is claimed is:

1. A vehicle bumper comprising:
   first and second opposed U-shaped members positioned such that a sidewall of each of said first and second U-shaped members are positioned adjacent one another; each of said first and second U-shaped members having a longitudinal axis; each of said first and second U-shaped members having a cross-section, said cross section varying along the length of said longitudinal axis;
   said first U-shaped member has first and second opposed sidewalls and said second U-shaped member has first and second opposed sidewalls, said first U-shaped member engaging said second U-shaped member such that at least one of said first and second opposed sidewalls of said first U-shaped member is located between said first and second opposed sidewalls of said second U-shaped member with the other opposed sidewall of said first U-shaped member located outside of said first and second opposed sidewalls of said second U-shaped member; and
   said first opposed sidewall of said first U-shaped member and said first opposed sidewall of said second U-shaped member combined to form a front face of said bumper.

2. A vehicle bumper as set forth in claim 1 including a detent formed on a sidewall of one of said first and second opposed U-shaped members and engaging the sidewall of the remaining opposed U-shaped member.

3. A vehicle bumper as set forth in claim 1 wherein each of said first and second U-shaped members have an identical shape.

4. A vehicle bumper as set forth in claim 1 including each of said first and second U-shaped members having opposed sidewalls, each of said opposed sidewalls having a detent located on an outer surface of said sidewall.

5. A vehicle bumper as set forth in claim 1 including a detent located on said first and second opposed sidewalls of said first U-shaped member and on said first and second opposed sidewalls of said second U-shaped member wherein said first and second U-shaped members are placed in a nested relationship with said first opposed sidewall of said first U-shaped member placed adjacent said first opposed sidewall of said second U-shaped member and said second opposed sidewall of said first U-shaped member placed adjacent to said second opposed sidewall of said second U-shaped member, at least one detent positioned on said respective first opposed sidewalls of said first and second U-shaped members and at least one detent positioned on said respective second opposed sidewalls of said first and second U-shaped members engage the respective opposite sidewall to position the respective first and second U-shaped members.

6. A vehicle bumper as set forth in claim 1 wherein said first and second opposed sidewalls of said first U-shaped member and said first and second opposed sidewalls of said second U-shaped member each include a plurality of cutouts, said cutouts on said first U-shaped member cooperating with said cutouts on said second U-shaped member to form a plurality of apertures in a front face and a rear face of said bumper.

7. A vehicle bumper as set forth in claim 1 including a plurality of deformation elements located on a base of at least one of said first U-shaped member and said second U-shaped member.

8. A vehicle bumper as set forth in claim 1 including at least one of said first U-shaped member and said second U-shaped member having a base portion including an inwardly extending indented portion.

9. A vehicle bumper comprising:
   a first U-shaped member having first and second opposed sidewalls connected by a base, each of said first and second opposed sidewalls of said first U-shaped member having an outer peripheral edge, said first U-shaped member extending longitudinally between first and second ends;
   a second U-shaped member having first and second opposed sidewalls connected by a base, each of said first and second opposed sidewalls of said second U-shaped member having an outer peripheral edge, said second U-shaped member extending longitudinally between first and second ends;
   said first U-shaped member and said second U-shaped member positioned such that said first opposed sidewall of said first U-shaped member is adjacent said first opposed sidewall of said second U-shaped member and said second opposed sidewall of said first U-shaped member is adjacent said second opposed sidewall of said second U-shaped member, and said outer peripheral edge of said first opposed sidewall of said first U-shaped member is located on an outer side of the first opposed sidewall of said second U-shaped member and between said outer peripheral edge of said first opposed sidewall of said second U-shaped member and said base of said second U-shaped member and said outer peripheral edge of said second opposed sidewall of said first U-shaped member is located on an inner side of said second opposed sidewall of said second U-shaped member and between said outer peripheral edge of said second opposed sidewall of said second U-shaped member and said base of said second U-shaped member, wherein said first opposed sidewalls of said first and second U-shaped members form a front face of said bumper; and at least a portion of said first and second U-shaped members curved with respect to a longitudinal axis of said first and second U-shaped members.

10. A vehicle bumper as set forth in claim 9 including said opposed sidewalls of said first U-shaped member having a plurality of cutouts extending inwardly from said outer peripheral edge of each of the opposed sidewalls; said opposed sidewalls of said second U-shaped member having a plurality of cutouts extending inwardly from said outer peripheral edge of each of the opposed sidewalls; and said cutouts of said first U-shaped member cooperating with said cutouts on said second U-shaped member to form an aperture in a front face and a rear face of said bumper.

11. A vehicle bumper as set forth in claim 10 including each of said first and second U-shaped members having a detent located on an outer surface of said opposed sidewalls.

12. A vehicle bumper as set forth in claim 11 including a mounting bracket attached to the rear face of said bumper.

13. A vehicle bumper as set forth in claim 9 wherein a cross-section of said bumper varies between said first and second ends of said first and second U-shaped members.

14. A vehicle bumper as set forth in claim 13 wherein each of said first U-shaped member and said second U-shaped member have a substantially identical shape.

15. A vehicle bumper as set forth in claim 13 including a deformation element located on said bumper.

16. A vehicle bumper as set forth in claim 9 including each of said first and second U-shaped members having a detent located on an outer surface of said opposed sidewalls.

17. A vehicle bumper as set forth in claim 9 wherein said first and second U-shaped members are made of 140 K.S.I. high-strength steel.

18. A vehicle bumper comprising:

a first U-shaped member having first and second opposed sidewalls connected by a base, said first member extending longitudinally between first and second ends, each of said first and second opposed sidewalls having a plurality of cutouts extending inwardly from an outer peripheral edge of each of said first and second opposed sidewalls, a detent located on each of said first and second opposed sidewalls;

a second U-shaped member having first and second opposed sidewalls connected by a base, said second member extending longitudinally between first and second ends, each of said first and second opposed sidewalls having a plurality of cutouts extending inwardly from an outer peripheral edge of each of said first and second opposed sidewalls, a detent located on each of said first and second opposed sidewalls; said first U-shaped member and said second U-shaped member positioned such that said first opposed sidewall of said first U-shaped member is adjacent said first opposed sidewall of said second U-shaped member and said second opposed sidewall of said first U-shaped member is adjacent said second opposed sidewall of said second U-shaped member and one of said detents located on said first sidewall of said first and second U-shaped members contacting an outer peripheral edge of one of said first and second U-shaped members and one of said detents located on said second sidewalls of said first and second U-shaped members contacting an outer peripheral edge of one of said second sidewalls of first and second U-shaped members, wherein said first opposed sidewalls of said first and second U-shaped members form a front face of said bumper; and said longitudinal axis of said first member coinciding with said longitudinal axis of said second member, said bumper including a cross-section that varies along the longitudinal axis of said first and second members.

* * * * *